US012567259B1

(12) United States Patent
Alsahafi et al.

(10) Patent No.: US 12,567,259 B1
(45) Date of Patent: Mar. 3, 2026

(54) SECURITY MONITORING MANAGEMENT SYSTEM AND METHOD

(71) Applicant: UNIVERSITY OF JEDDAH, Jeddah (SA)

(72) Inventors: Yousef S Alsahafi, Jeddah (SA); Fahad Alsolami, Jeddah (SA); Abdullah Albahdal, Jeddah (SA)

(73) Assignee: UNIVERSITY OF JEDDAH, Jeddah (SA)

( * ) Notice: Subject to any disclaimer, the term of this patent is extended or adjusted under 35 U.S.C. 154(b) by 0 days.

(21) Appl. No.: 19/205,311

(22) Filed: May 12, 2025

(51) Int. Cl.
| | |
|---|---|
| *G06V 20/52* | (2022.01) |
| *G06T 7/70* | (2017.01) |
| *G06V 10/764* | (2022.01) |
| *G06V 40/16* | (2022.01) |
| *G06V 40/20* | (2022.01) |

(52) U.S. Cl.
CPC .............. *G06V 20/52* (2022.01); *G06T 7/70* (2017.01); *G06V 10/764* (2022.01); *G06V 40/172* (2022.01); *G06V 40/20* (2022.01)

(58) Field of Classification Search
CPC ........ G06T 7/70; G06V 10/764; G06V 20/52; G06V 40/20; G06V 40/172; G06K 9/00295; G06K 9/00771; G06Q 10/02; G06Q 50/265; G06Q 2240/00
See application file for complete search history.

(56) References Cited

U.S. PATENT DOCUMENTS

| | | | |
|---|---|---|---|
| 7,558,404 B2 | 7/2009 | Ma et al. | |
| 8,811,663 B2 | 8/2014 | Brown et al. | |
| 10,591,281 B2 | 3/2020 | Sabitov et al. | |
| 10,789,796 B1 * | 9/2020 | Munir .................. | G06V 40/172 |
| 12,340,548 B2 * | 6/2025 | Kunitake .............. | H04N 23/90 |
| 2018/0096197 A1 * | 4/2018 | Kephart ............... | G06V 40/173 |
| 2018/0275764 A1 * | 9/2018 | Lee ......................... | G06V 40/28 |
| 2019/0043281 A1 * | 2/2019 | Aman .................... | G07C 9/215 |
| 2023/0394898 A1 * | 12/2023 | Rojas ................. | G07C 9/00857 |

OTHER PUBLICATIONS

Doshi, K., et al., "Multi-Task Learning for Video Surveillance with Limited Data," Conference: 2022 IEEE/CVF Conference on Computer Vision and Pattern Recognition Workshops (CVPRW), Jun. 2022, IEEE.
Gu, S., et al., "A Unified Multi-Task Learning Framework of Real-Time Drone Supervision for Crowd Counting," arXiv:2202.03843v1 [cs.CV] Feb. 8, 2022.
Zhang, Y., et al., "Congested Crowd Counting via Adaptive Multi-Scale Context Learning," Sensors, May 29, 2021, vol. 21, 3777, pp. 1-18, MDPI.
Nallola, S., et al., "Twenty-Five Years of Real-Time Surveillance Video Analytics: A Bibliometric Review," Multimedia Tools and Applications, Jan. 31, 2024, vol. 83, pp. 69273-69306, Springer.

* cited by examiner

*Primary Examiner* — Peet Dhillon
(74) *Attorney, Agent, or Firm* — PATENT PORTFOLIO BUILDERS PLLC

(57) ABSTRACT

A method for real-time security monitoring within a venue includes capturing an image of a first attendee that exhibits an abnormal behavior, detecting a seat location occupied by the first attendee, in a seating area of the venue, progressively searching larger subsets of neighbors occupying neighboring seats of the occupied seat location for identifying the first attendee, and notifying one or more assets about an identify of the first attendee.

20 Claims, 13 Drawing Sheets

| (1,1) | (1,2) | (1,3) | (1,4) | (1,5) | (1,6) | (1,7) | (1,8) | (1,9) | (1,10) |
|-------|-------|-------|-------|-------|-------|-------|-------|-------|--------|
| (2,1) | (2,2) | (2,3) | (2,4) | (2,5) | (2,6) | (2,7) | (2,8) | (2,9) | (2,10) |
| (3,1) | (3,2) | (3,3) | (3,4) | (3,5) | (3,6) | (3,7) | (3,8) | (3,9) | (3,10) |
| (4,1) | (4,2) | (4,3) | (4,4) | (4,5) | (4,6) | (4,7) | (4,8) | (4,9) | (4,10) |
| (5,1) | (5,2) | (5,3) | (5,4) | (5,5) | (5,6) | (5,7) | (5,8) | (5,9) | (5,10) |

| | Seat ID | Row | Column | Facial Embedding (Vector) | Assigned User ID | Neighbor Seats |
|---|---|---|---|---|---|---|
| 1 | (3, 5) | 3 | 5 | [0.12, 0.25, 0.36, ...] | User_123 | (3, 4), (3, 6), (2, 5), (4, 5) |
| 2 | (3, 4) | 3 | 4 | [0.10, 0.22, 0.33, ...] | User_124 | (3, 3), (3, 5), (2, 4), (4, 4) |
| 3 | (3, 6) | 3 | 6 | [0.15, 0.26, 0.39, ...] | User_125 | (3, 5), (3, 7), (2, 6), (4, 6) |
| 4 | (2, 5) | 2 | 5 | [0.11, 0.21, 0.31, ...] | User_126 | (1, 5), (3, 5), (2, 4), (2, 6) |
| 5 | (4, 5) | 4 | 5 | [0.14, 0.28, 0.38, ...] | User_127 | (3, 5), (5, 5), (4, 4), (4, 6) |
| 6 | (3, 3) | 3 | 3 | [0.09, 0.20, 0.30, ...] | User_128 | (3, 2), (3, 4), (2, 3), (4, 3) |
| 7 | (3, 7) | 3 | 7 | [0.16, 0.27, 0.40, ...] | User_129 | (3, 6), (3, 8), (2, 7), (4, 7) |

SECURITY MONITORING MANAGEMENT SYSTEM AND METHOD

BACKGROUND OF THE INVENTION

Technical Field

Embodiments of the subject matter disclosed herein generally relate to a system and method for monitoring a venue for security purposes, and more particularly, to a security monitoring management system that is capable of identifying one or more attendees associated with an abnormal activity.

Discussion of the Background

There are various scenarios in which a larger number of people get together for a certain purpose, for example, listening to music at a concert venue, watching a soccer game at a stadium, etc. These events typically attract thousands of people and such a density of people in a confined area make the events prone to medical events (e.g., a person collapses due to a medical condition) that might require a quick response from the venue management. These events may also become a target for malicious persons that intend either to produce mayhem (e.g., terrorism related activities) or to take advantage of the situation (e.g., theft, vandalism, etc.). To counter these potential problems, the management company running these large venues have implemented over time various layers of security, for example, metal detectors, bag searches, having security agents throughout the venue for monitoring suspicious acts or persons, security cameras, intrusion detection systems, etc.

A security monitoring management system is an important tool for any organization or enterprise that wants to ensure the safety and security of its assets, employees, and customers. It is a software solution that allows organizations and enterprises to monitor and manage, from a centralized location, their security systems, including surveillance cameras, access control systems, and intrusion detection systems. However, because the usually large number of people in a confined space, the existing security monitoring management systems have difficulties monitoring and controlling access and detecting security threats in real or near real time.

A security monitoring management system requires various tools and technologies to effectively detect, prevent, and respond to abnormal activities, for example, security threats. Face recognition may be a valuable tool for a security monitoring management system, as it allows for the identification and tracking of individuals in real-time. By integrating face recognition technology into a security monitoring system, organizations can improve their ability to detect and respond to security threats, while also enhancing the efficiency of their security operations.

However, matching in real or near real time a person's face, acquired by the surveillance cameras at the venue, to a dataset of faces stored or available to the security monitoring management system, depends on several factors, including the size of the dataset, the complexity of the face recognition algorithm, and the computing resources available. In general, matching a face to a dataset can be a time-consuming process, especially if the dataset is very large. For example, matching a single face to a dataset of one million images could take several minutes or longer, depending on the algorithm and the available computing resources.

In this regard, Sudheer et al. [1]proposes a real-time face recognition system for security monitoring in crowded stadiums. The system uses deep learning techniques to detect and recognize faces in real-time from multiple camera feeds. The system also incorporates a behavior analysis module that can detect abnormal behavior, such as running or fighting, and alert security personnel. Akhmedov et al. [2]propose a real-time crowd analysis system for stadiums that combines face recognition, crowd density estimation, and crowd behavior analysis. The system is designed to detect potential security threats, such as fights or stampedes, and alert the security personnel. The authors in [2] demonstrated the effectiveness of the system in a simulated stadium environment and showed that it outperforms existing systems in terms of accuracy and speed. Zhao et al. [3]proposed a multi-scale and multi-modal framework for real-time human detection and re-identification in crowded scenes. The system uses a combination of deep learning techniques and facial recognition technology to detect and track individuals in real-time, even in crowded and complex scenes. The authors in [3] demonstrated the effectiveness of the system in a stadium environment and showed that it outperforms existing systems in terms of accuracy and robustness. Wu et al. [4]proposed a multi-task deep learning framework for real-time video analysis of crowded scenes, with a focus on security monitoring in stadiums. The system uses a combination of face detection, recognition, and crowd behavior analysis to detect potential threats and alert security personnel. The authors in [4] demonstrated the effectiveness of the system in a simulated stadium environment and showed that it outperforms existing systems in terms of accuracy and speed. Shahid et al. [5]proposed a real-time crowd monitoring system for safety enhancement in stadiums, with a focus on detecting and preventing stampedes. The system uses facial recognition technology to track individuals and estimate crowd density, and incorporates a crowd behavior analysis module that can detect abnormal behavior and alert security personnel. The authors in [5] demonstrated the effectiveness of the system in a simulated stadium environment and showed that it can significantly improve safety measures in crowded events. Another group patent describes a system and method for monitoring crowd behavior in real-time, using facial recognition technology to detect and track individuals in crowded environments, such as stadiums. The system can identify potential threats, such as fights or stampedes, and alert security personnel to take appropriate action. Still another group describes a method and apparatus for real-time recognition of faces in video streams for security purposes, using a combination of facial recognition technology and deep learning algorithms. The system can detect and track individuals in crowded environments, such as stadiums, and identify potential security threats.

However, all these approaches suffer from a similar problem: the long time needed by the system to compare the identified person that is part of the abnormal behavior with a person in an existing large database. Thus, only having surveillance cameras, access control systems, and intrusion detection systems as part of the security monitoring management system and a control module that searches a large database for finding a match with a suspect attendee is not enough for achieving an efficient system. There is a need for a technique that integrates all these parts of the system with a fast searching algorithm for making the identification process of the suspect attendee as fast as possible, so that the security agents available in the field can quickly and efficiently intervene and control or provide help to the suspect attendee.

SUMMARY OF THE INVENTION

According to an embodiment, there is a method for real-time security monitoring within a venue, and the method includes capturing an image of a first attendee that exhibits an abnormal behavior, detecting a seat location occupied by the first attendee, in a seating area of the venue, progressively searching larger subsets of neighbors occupying neighboring seats of the occupied seat location for identifying the first attendee, and notifying one or more assets about an identify of the first attendee.

According to another embodiment, there is a system for real-time security monitoring within a venue, and the system includes an input interface configured to receive an image of an attendee that exhibits an abnormal behavior, and a processor in communication with the input interface. The processor is configured to detect a seat location occupied by the first attendee, in a seating area of the venue, progressively search larger subsets of neighbors occupying neighboring seats of the occupied seat location for identifying the first attendee, and notify one or more assets about an identify of the first attendee.

According to yet another embodiment, there is a non-transitory computer readable medium including computer executable instructions, where the instructions, when executed by a processor, implement the methods discussed in this document.

BRIEF DESCRIPTION OF THE DRAWINGS

For a more complete understanding of the present invention, reference is now made to the following descriptions taken in conjunction with the accompanying drawings, in which:

FIG. 8 schematically illustrates how the data about the neighbors of a suspected attendee is configured in a database;

DETAILED DESCRIPTION OF THE INVENTION

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to an indoor arena that has a performance stage and multiple seats located around the stage. However, the embodiments to be discussed next are not limited to an indoor arena, but may be applied to other venues, indoor or outdoor, that are designed to accommodate large amount of people. Also, the embodiment to be discussed next are not limited to an indoor arena having a performance stage. Any indoor facility (e.g., warehouse, office space, etc.) may be provided with the systems and methods discussed herein.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, a security monitoring management system for a venue (e.g., arena, stadium, etc.) includes hardware and software components for monitoring multiple attendees, analyzing data collected with reference to the multiple attendees, identifying an abnormal situation (e.g., a threat or medical condition, or stampede, etc.), identifying one or more attendees that are associated with the abnormal situation, and providing an identification of the attendee associated with the abnormal situation to a security resource. A structure of such system and methods associated with the system are now discussed with regard to the figures.

Figure 1:
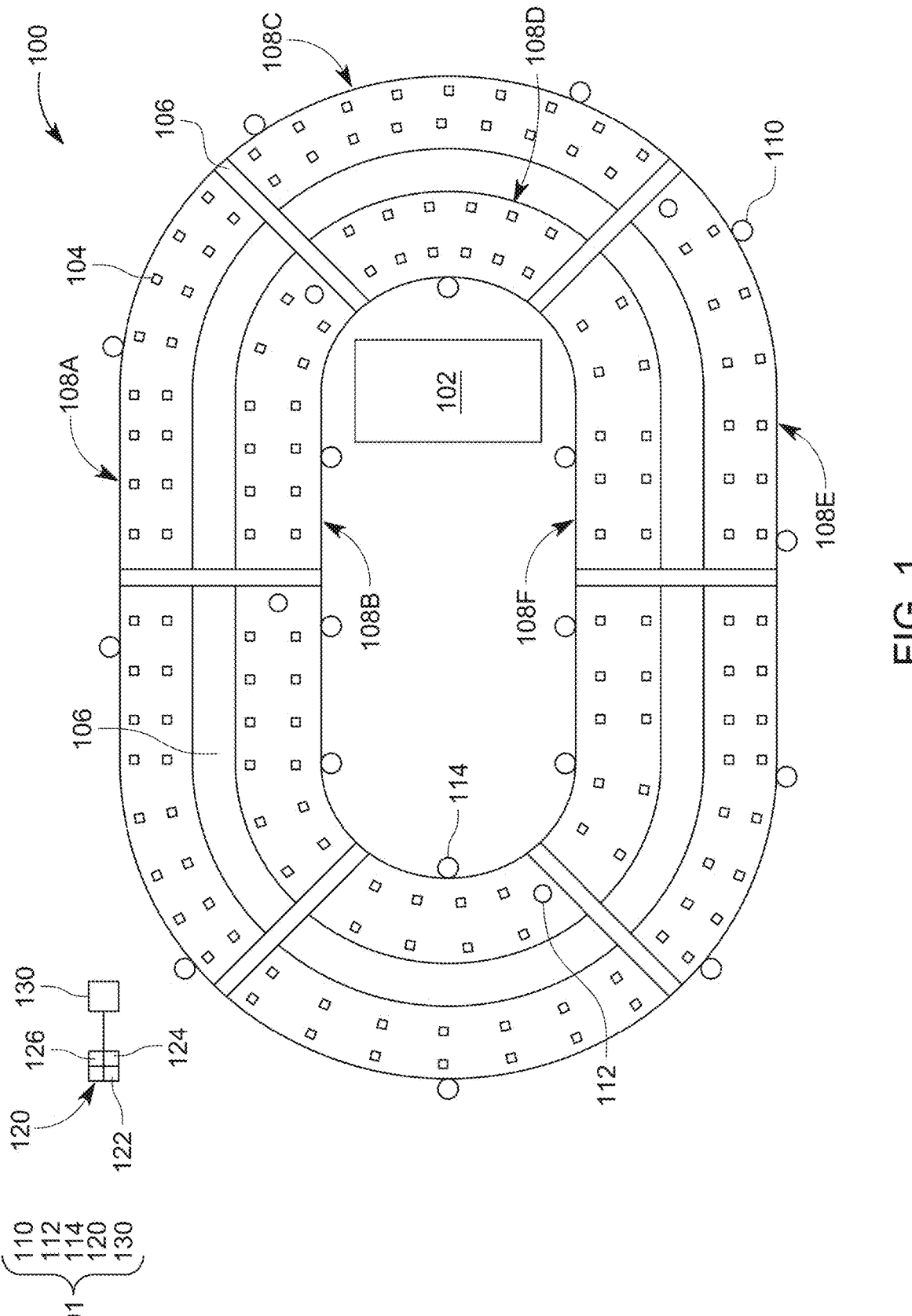
FIG. 1 is a schematic diagram of a venue having multiple seats for accommodating multiple attendees, and plural monitoring cameras.

FIG. 1 schematically illustrates a venue 100 that hosts a performing stage 102 and multiple seats 104 distributed around the stage 102. The number of seats 104 may be from hundreds to tens of thousands. Note that in one embodiment the venue 100 may be a stadium, in which case there is no stage 102 and the number of seats may be in the hundreds of thousands. The figure further shows access paths 106 separating various seat areas 108A to 108F. A security monitoring management system 101 used for the venue 100 includes multiple cameras 110, 112, and 114, which are distributed throughout the venue 100. The cameras 110 are located toward an outer perimeter of the seat areas, cameras 112 are located within the seat areas, and cameras 114 are located toward in inner perimeter of the seat areas. Any arrangement of the cameras are possible. For example, it is possible to have drones provided with cameras, instead or in addition to the ground cameras 110 to 114. The ground cameras may be located on poles, suspended from wires, or the ceiling of the venue. The cameras may include various types of cameras, for example, visible light cameras, infrared cameras, X-ray cameras, etc. for detecting a certain attendee or action in different wavelength ranges. The cameras may be wired or in a wireless connection with a control module 120.

The control module 120 may located within the venue or remotely. The control module 120 includes, at a minimum, one or more processors 122, memory units 124, and one or more transceivers 126 for communicating with the cameras and security agents present inside the arena. The control module 120 may communicate in a wireless manner with the cameras 110, 112, and 114, for example, through a 5G telecommunication network. However, other wireless communication protocols may be used. The control module 120 may also communicate with a database 130, which is locally placed or remotely. The database 130, as discussed later, may be configured to store data associated with the attendees entering the venue and/or previous attendees or even persons that are not associated with the venue (for example, known law offenders).

The processor 122 is configured, among others, with a face recognition algorithm like, for example, DeepFace, OpenFace, dlib, FaceNet, Amazon Rekognition, Microsoft Azure Face API, Google Cloud Vision AI, etc. One or more of the cameras 110 to 114 are configured to capture images of the people occupying the seats 104, and the processor 122 is configured to extract, from the captured images, various features (e.g., landmarks, distances between the features, texture and skin pattern, etc.) that are specific to the face of the attendee. These features are then mathematically transformed into facial embeddings associated with the attendees in the arena. A facial embedding is a numerical representation (e.g., a vector or matrix) of a attendee's facial features extracted from an image. The facial embeddings are then mapped not only to the attendee captured in the image, but also to a seat location in the venue, which is assigned to the attendee, i.e., a specific seat 104.

Figure 2:
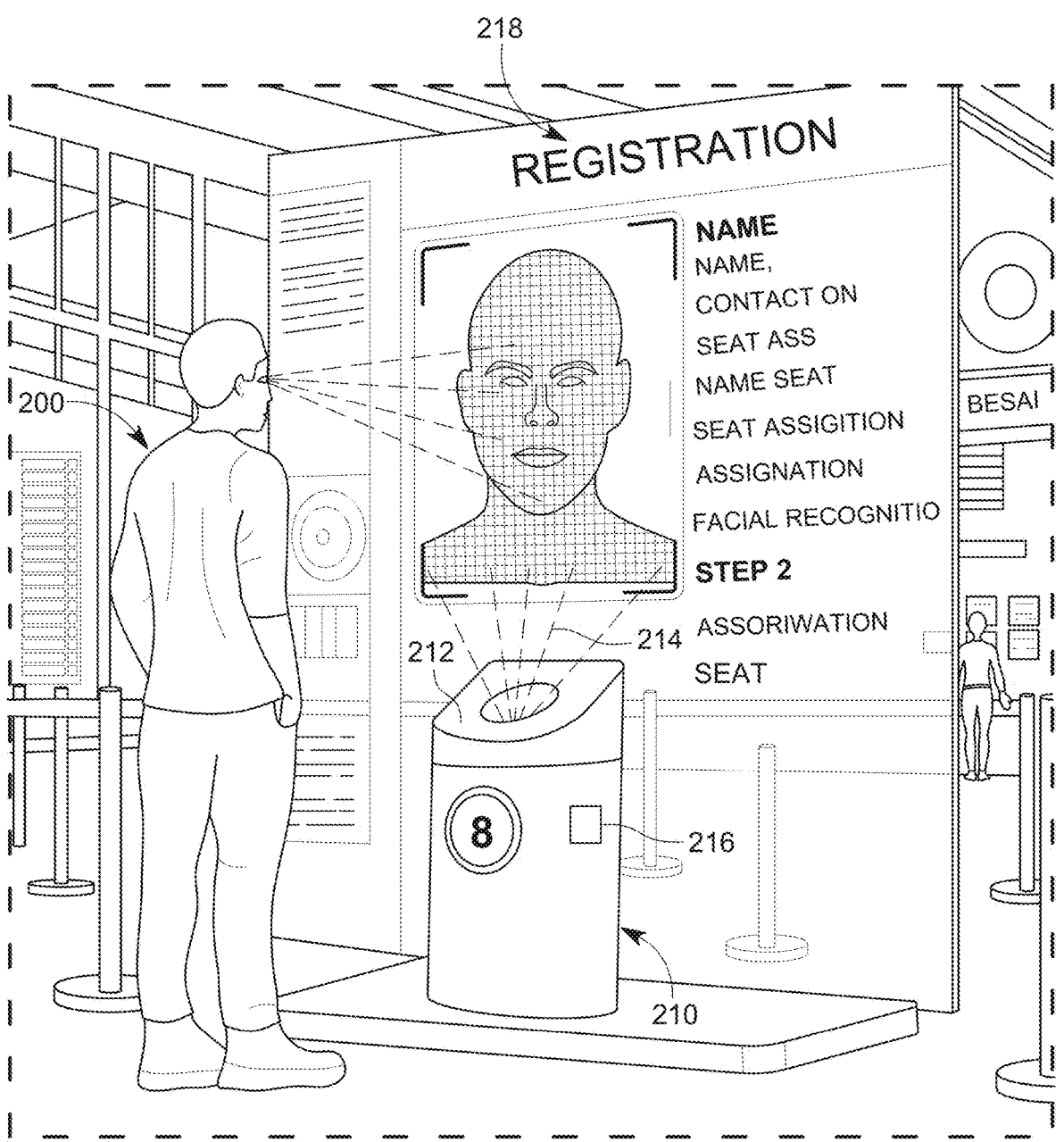
FIG. 2 schematically illustrates a kiosk for scanning an incoming attendee and acquiring additional data of the attendee.
Figure 3:
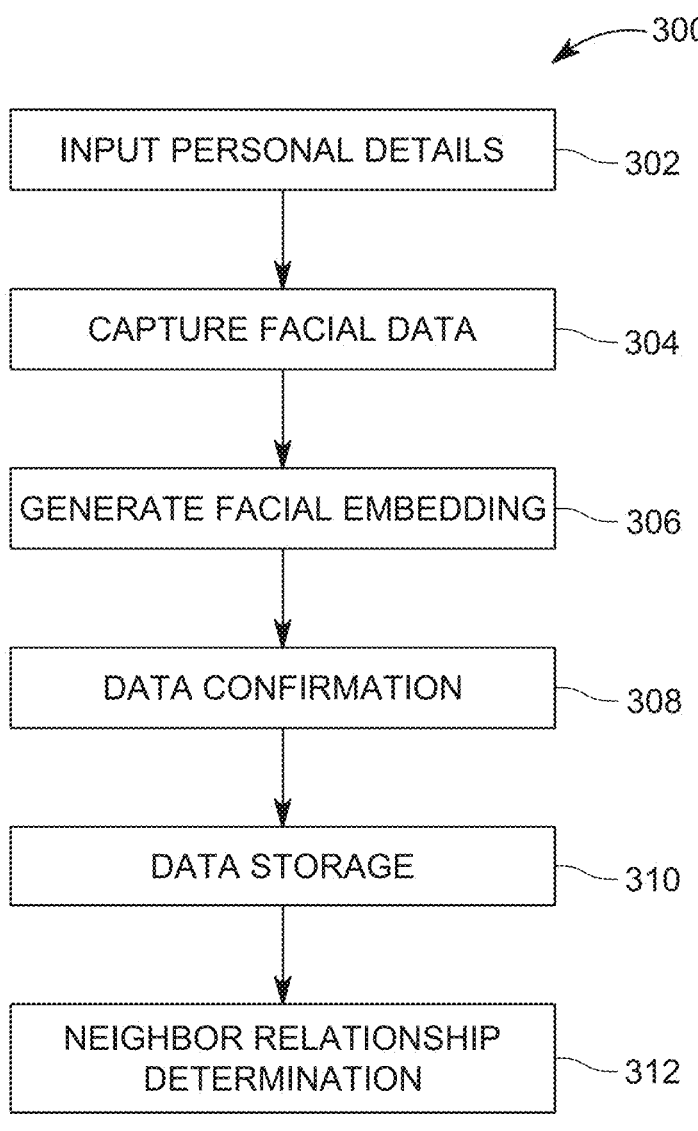
FIG. 3 is a flow chart of a method for registering an attendee prior to entering the venue.

This feature is possible due to a registration process that is undergone by each attendee before entering the venue. As illustrated in FIG. 2, prior to entering the venue, each attendee 200 interacts with a self-service registration kiosk 210 (or with a staff member having access to a registration system). During this process 300, as illustrated in FIG. 3, the attendee 200 interacts, for example, with an interface 212 of the kiosk 210 and inputs/enters 302 required personal information. In one embodiment, the interface 212 is a keyboard or touch-sensitive screen and the attendee 200 manually inputs the data. In another embodiment, the interface 212 is a wireless reader that reads the data from a ticket, a QR code on the cell phone of the attendee 200, etc. Examples of the personal information collected during the registration step may include at least one of: full name of the attendee, date of birth, contact information (for example, phone number, email, etc.), and a seat assignment in the venue (e.g., row 3, seat 5, area 108C).

Simultaneously, or sequentially, the kiosk 210 uses one or more cameras 214 for capturing 304 an image of the attendee 200. The kiosk 210 prompts the attendee 200 to stand in front of the facial recognition camera 214. In one application, the camera 214 captures multiple images of the attendee's face for accuracy. Camera 214 and associated processing device 216 (e.g., a processor) may provide a live camera feed on the kiosk's screen 218 to provide feedback to the attendee, for example, "Face detected" or "Adjust position." Any of the algorithms discussed above may be used for preprocessing the captured image, ensuring uniform lighting, angle, and clarity. In one application, the attendee 200 may perform the registration step from home, with a personal computer equipped with a camera and an input/output interface, or even while on the move, from a smartphone equipped with such a camera and input/output interface.

Next, the method 300 generates 306 facial embeddings for all the attendees entering the venue. More specifically, the captured facial data is transmitted from the kiosk 210 to the control module 120, where the processor 122 generates a facial embedding per each attendee 200. For example, a high-dimensional numerical vector representing the unique features of the attendee's face is generated. The numerical vector is generated by applying, for example, an alignment method to detect the facial landmarks from the image. This involves identifying specific points on the face, such as the corners of the eyes, node, and mouth. As these characteristics are unique to each attendee, they can be used to identify them. In one application, machine learning models such as ArcFace or FaceNet, are used to extract the facial landmarks from the image and generate the facial embedding for each attendee. Such a system ensures high accuracy and uniqueness in the facial representation.

Next, the method 300 advances to a data confirmation checking step 308. The kiosk 210 displays on its monitor 218 a summary of the attendee's details for review. As schematically illustrated in FIG. 2, the monitor 218 may display the name, the assigned seat, and a snapshot of the attendee's face captured during the registration process. A confirmation screen with a field "Confirm" or "Edit" button allows the attendee 200 to verify and edit, if necessary, their details.

When the attendee 200 confirms that the entered data is accurate, the control module 120 stores 310 all data in a secured way in a centralized database 130, which is schematically shown in FIG. 1. The data may include one or more of the personal details provided by the attendee, their seat number in the venue, and a mapping in the seating grid of the venue, and a link between the facial embedding and the attendee's seat. In one embodiment, the database 130 may precompute 312 neighbor relationships (various levels of neighbors) for each seat. This process is discussed in more detail later.

The registration process 300 and the associated kiosk 210 are configured to use an intuitive touchscreen interface guide for the attendee through each step. In one application, the kiosk is configured to provide multilingual support to ensure wide accessibility. In one embodiment, the entire registration process 300 is configured to take less than 2 minutes. High-speed cameras and optimized algorithms ensure a quick embedding generation. The system 101 supports large-scale venues with thousands of attendees. Multiple kiosks 210 or registration stations can operate simultaneously. In one embodiment, for security purposes, all collected data is encrypted. The biometric data is processed locally, at the control module 120, before being stored securely at the database 130.

At the conclusion of the registration process 300, the attendee 200 is successfully registered, with their personal information, seat assignment, and facial embedding stored in the system. This data enables real-time identification during surveillance, neighbor-based searches, and security monitoring in case of abnormal activities such as incidents or medical emergencies.

Figure 4:
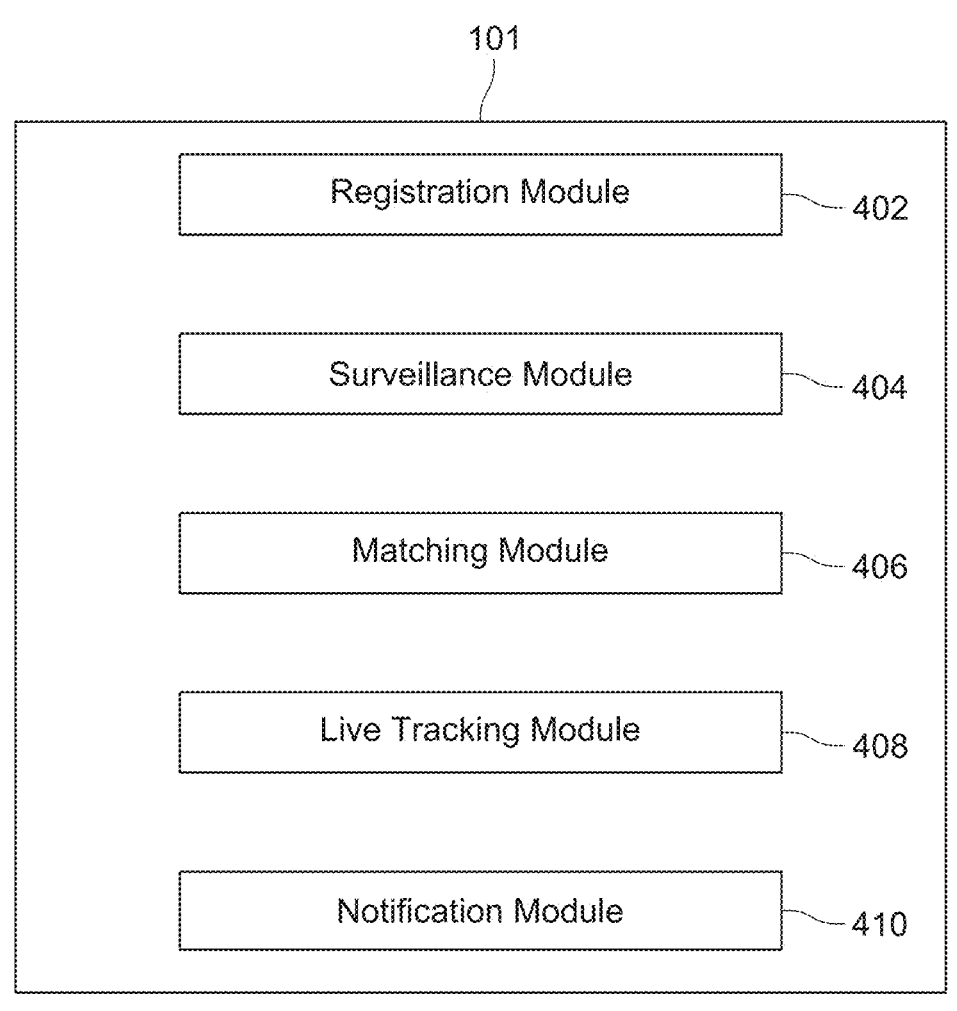
FIG. 4 is a schematic diagram of a security monitoring management system that applies a progressive neighbor search for identifying an attendee that exhibits an abnormal behavior.

The registration process 300 may be implemented in a registration module of the system 101. In this regard, FIG. 4 illustrates an architecture of the system 101, which includes a registration module 402. The architecture may also include a surveillance module 404, a matching module 406, a live tracking module 408, and a notification module 410. These modules may be implemented in software, hardware, or a combination of software and hardware. For example, the registration module 402 may be partially implemented as software in the control module 120 and partially in the kiosk 210, as both software and hardware.

The surveillance module 404 may be partially implemented as software in the control module 120 and partially in the cameras 110 to 114. In one embodiment, the surveillance module 404 may include cameras 110 to 114. The surveillance module 404 is configured to monitor the attendees using the cameras. The surveillance module 404 is also configured to detect abnormal behavior, such as loitering, entering restricted areas, or erratic movements. The control module 120 may flag one or more attendees based on the detected abnormal behavior, and the surveillance module 404 is further configured to capture facial embeddings of the flagged attendees in real-time.

The matching module 406 may be partially implemented as software in the control module 120, and partially implemented, also as software, in the kiosk 210, and/or cameras 110 to 114. The matching module is configured to match the detected embeddings (generated by the surveillance module 404) to the stored embeddings (in the database 130) for identifying one or more seats corresponding to one or more attendees that are misbehaving, or need medical attention, etc. Then, the matching module 406 may confirm the attendee's identity if a match is found. If no initial match is found, the matching module 406 progressively expands the search area to include neighbors and, if necessary, broader zones. Details of this approach are discussed later. In one embodiment, the matching module 406 may use approximate nearest neighbors (ANN) algorithms for efficient matching.

The live tracking module 408 may be implemented as software at the control module 120 and/or as software at the cameras 110 to 114. The live tracking module 408 may be configured to assign a session identifier (ID) to each of the identified attendees that are misbehaving or need medical attention, for continuous monitoring. The live tracking module 408 may track movement of the attendees using overlapping camera zones and update their location on a live map.

The notification module 410 is configured to send alerts (e.g., text messages, phone calls, emails, notifications, etc.) to security personnel with details of the attendee's identification and location, movement history, and/or behavior.

Figure 5A:
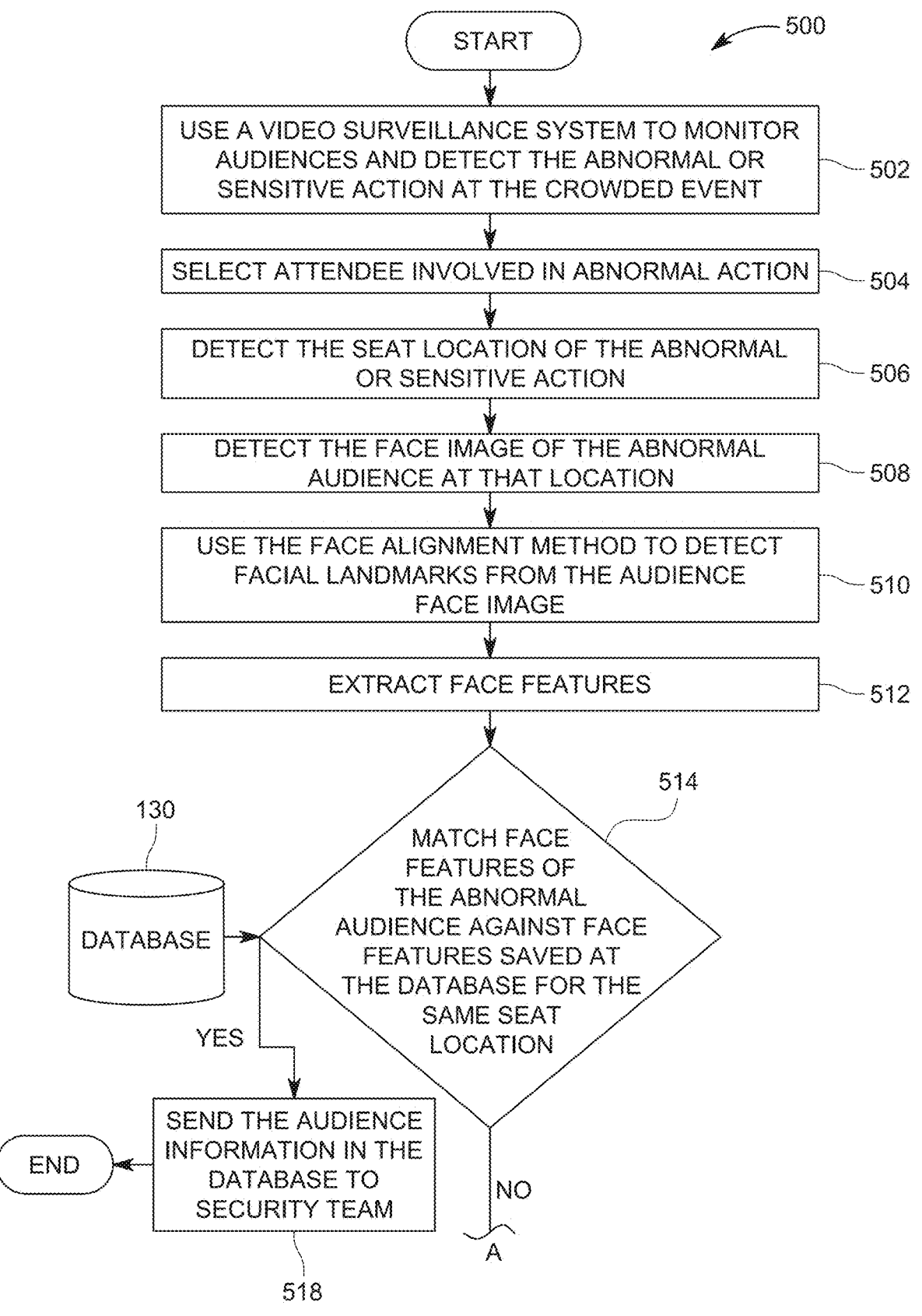
FIGS. 5A to 5C are flow charts of a method that uses the progressive neighbor search for identifying the attendee that exhibits the abnormal behavior.
Figure 5B:
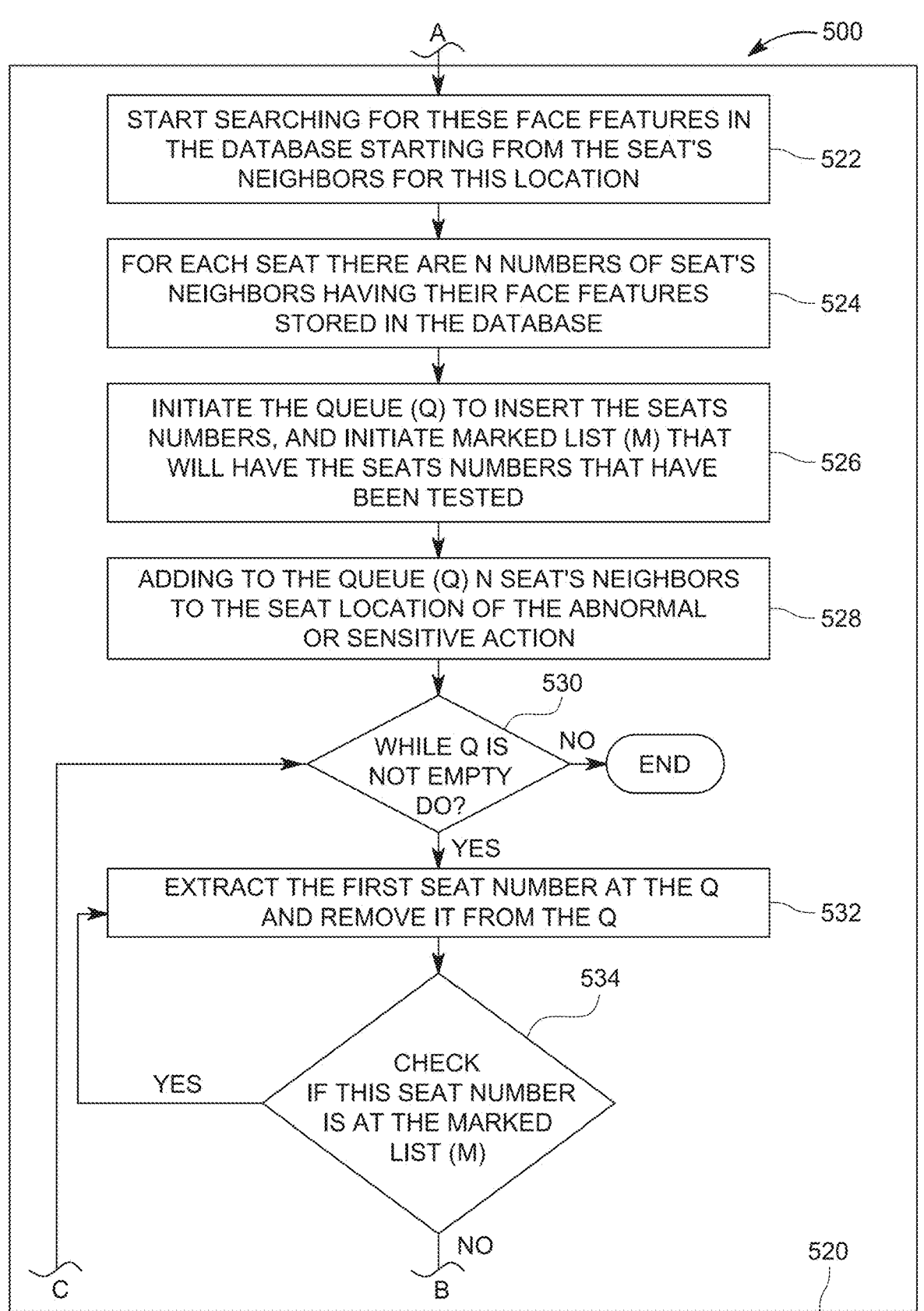
Figure 5C:
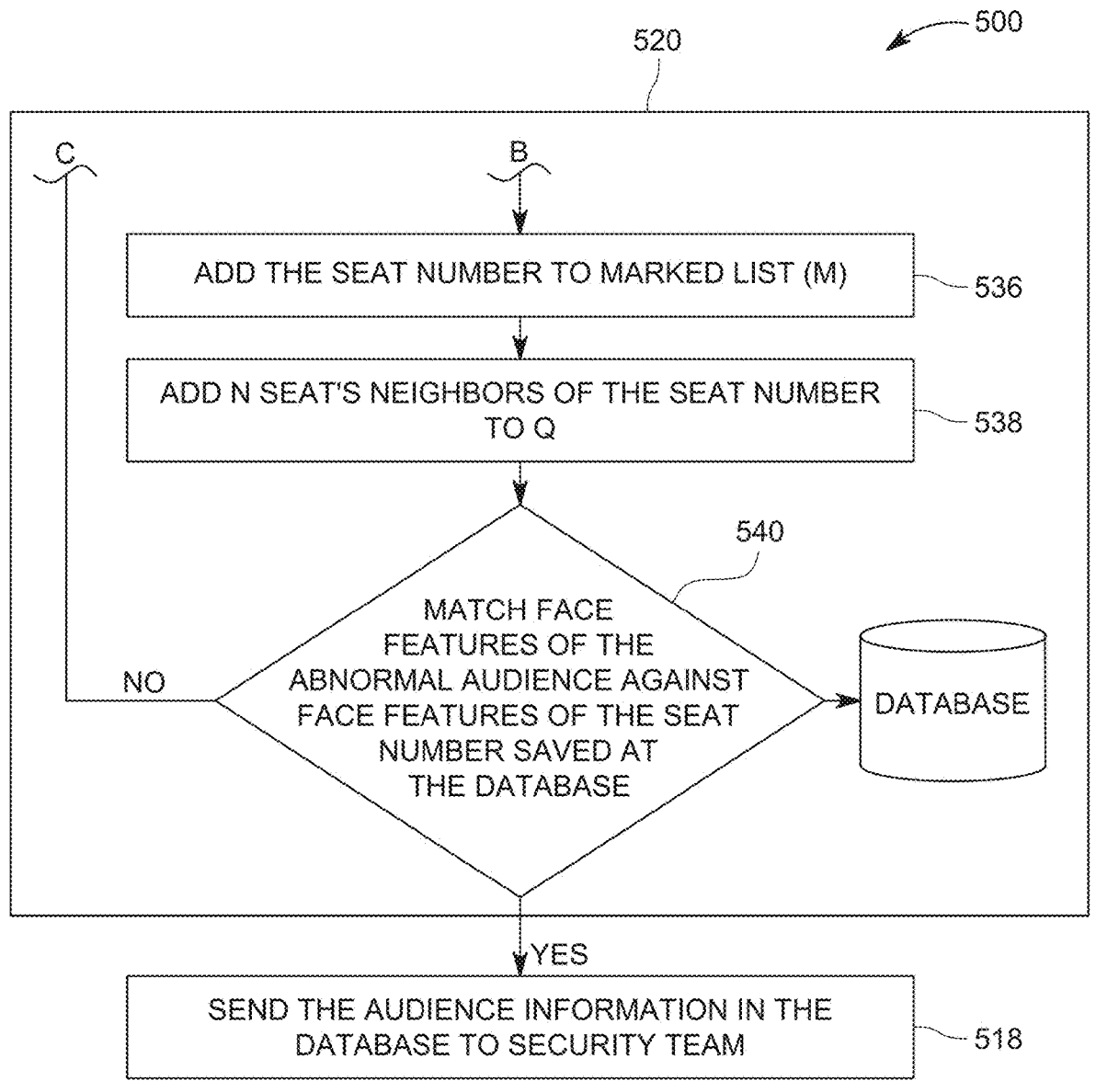
Figure 6A:
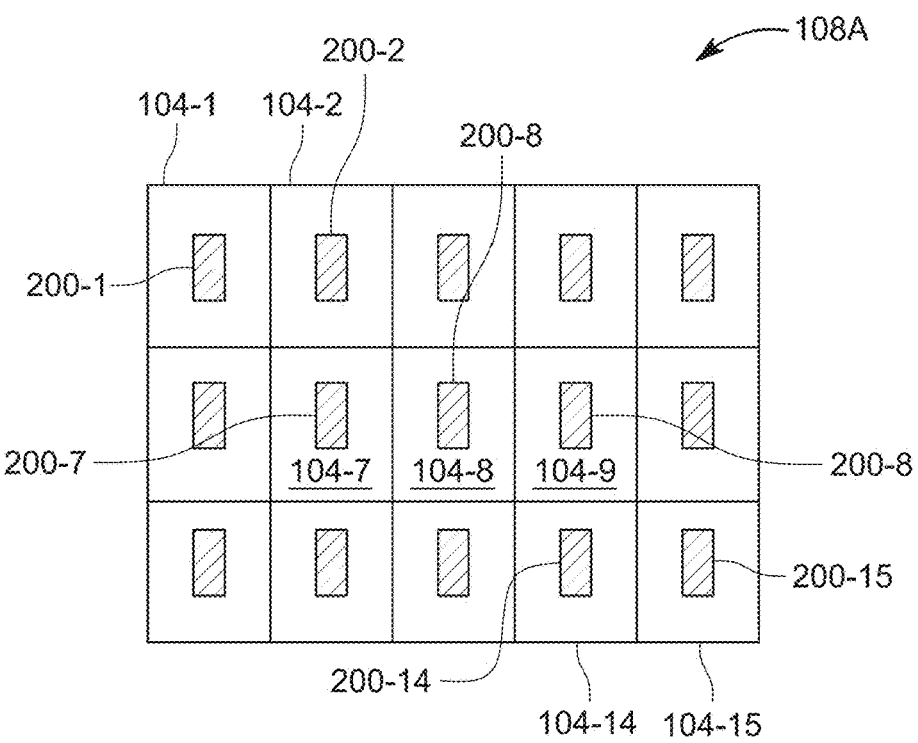
FIGS. 6A to 6C schematically illustrate the location of the attendees in the venue according to various scenarios.
Figure 6B:
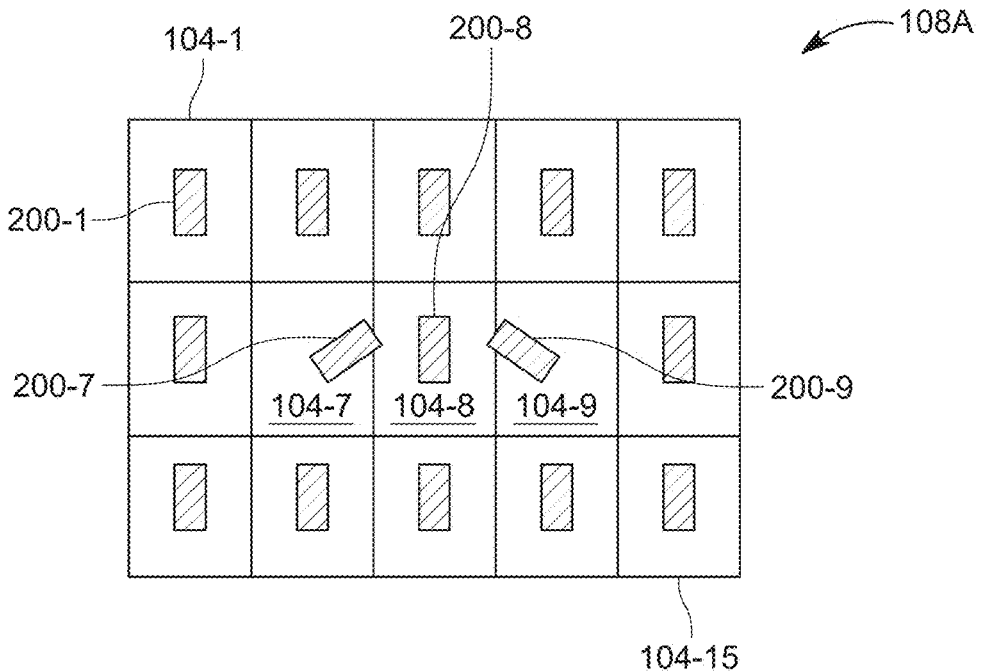
Figure 6C:
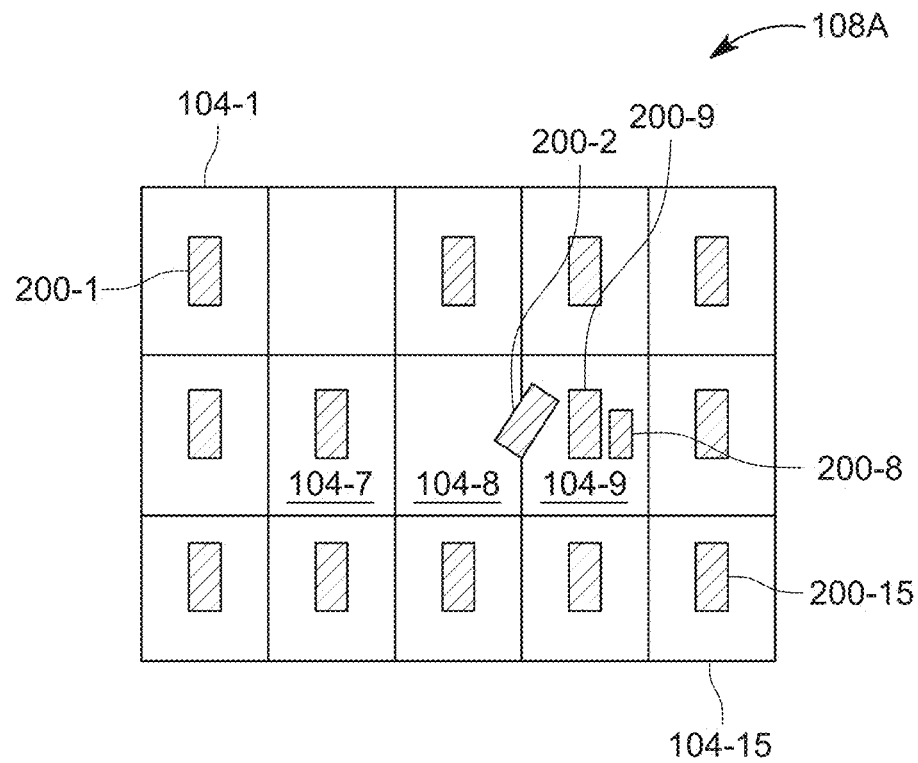

A method for identifying an attendee exhibiting an abnormal behaviour at the avenue 100, using the system 101 and based on a progressive neighbor search workflow, is now discussed with regard to FIGS. 5A to 5C. The method 500 starts when an abnormal activity or behavior of one or more attendees is detected in step 502. The abnormal activity is detected when at least one of the surveillance cameras 110 to 114 identifies such abnormal behavior at a specific seat. For example, FIG. 6A schematically illustrates a seat section 108A of the venue 100. The seat section 108A in this example includes 15 seats 104-1 to 104-15 and a corresponding number of attendees 200-1 to 200-15. Each attendee is occupying their assigned seat. No disturbance is detected in FIG. 6A as each attendee is occupying their seat. However, FIG. 6B shows a disturbance occurring at seats 104-7 to 104-9, for attendees 200-7 to 200-9, as at least one of these attendees is engaged with another attendee. FIG. 6C also shows a disturbance occurring at seats 104-7 to 104-9, but this time the attendees are not at their assigned seats. For this specific scenario, the attendee 200-2 is partially in the seat 104-8 and the rightful attendee 200-8 of seat 104-8 is present at the location of another seat 104-9.

The surveillance module 404, which monitors the images captured by the cameras 110 to 114, is configured to detect that such a scene is not a normal scene, but rather an abnormal scene. Note that various machine learning algorithms exist that are trained to distinguish between when a group of people in close proximity to each other have a friendly conversion and when not. If such machine learning algorithm determines that the event shown in FIG. 6B or FIG. 6C does not appear to be a normal event, the algorithm flags one or more of the attendee associated with the abnormal activity. Then, the surveillance module 404 captures the facial embedding of the flagged attendee(s), e.g., attendees 200-7 to 200-9 in FIG. 6B or attendee 200-2 in FIG. 6C. Note that it is possible that the surveillance module 404 selects 504 a single attendee 200-8 for the scenario shown in FIG. 6B or 200-2 for the scenario shown in FIG. 6C. This selection may be based on a geometrical center of the image, a random choice, an input from the operator of the system 101, etc. Next, the system 101 (for example, the processor at the control module 120) determines 506 a seat location 104-8 of the selected attendee (note that the seat mapping of the venue is known by the system 101, and based on an image captured by a camera, the processor 122 may determine the exact seat location and seat number of the abnormal activity in the captured image) and the surveillance module 404 also detects 508 the face image of the attendee present at the detected seat location (attendee 200-8 in FIG. 68 or attendee 200-2 in FIG. 6C).

Once the attendee 200-8/200-2 (assumed to be associated with the seat 104-8) is selected and their face is captured in step 508, the surveillance module 404 uses 510 the face alignment method to detect the facial landmarks from the captured image and extracts 512 the facial embedding for the attended 200-8/200-2. The matching module 406 then performs an initial matching 514 of the captured embeddings to one of the registered embeddings stored in the database 130, during the registration process 300. Two outcomes are possible for the matching step 514.

The first outcome is that a match is found, at the selected seat 104-8, between (1) the initially selected attendee 200-8, and (2) the facial embedding stored in database 103 for the selected seat 104-8. This is true for the scenario shown in FIG. 6B, but not for the scenario shown in FIG. 6C. Thus, for this outcome, the attendee 200-8 is confirmed to belong to the flagged seat 104-8 and venue agents are informed 518 about the identify of this attendee, so that they help the situation. Note that this scenario also applies when an attendee has collapsed, for example, due to a medical emergency, and medical help is necessary to be dispatched as soon as possible.

The second outcome is that a match is not found. This means that the calculated facial embedding for the selected attendee 200-2 (scenario shown in FIG. 6C) do not match the facial embedding associated with the attendee 200-8 registered to the selected seat 104-8 (which are stored in database 130). For this case, the method 500 needs to continue the search. Instead of performing a brute search through all the attendees 200 at the venue 100, to method 500 implements a progressive neighbor-based search procedure 520, which is schematically illustrated in FIGS. 5A to 5C. Note that the advantage of this procedure is that instead of verifying the facial embeddings of all the attendees in the database 130, this procedure selects a few attendees for a first stage verification, which is a very quick process. If the first stage verification fails to produce a match, a second stage verification, that includes more neighbors is performed, and so on until the correct attendee is found.

Figure 7:
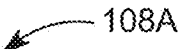
FIG. 7 schematically illustrates a seat chart of a part of the venue and how the neighbor seats are split into various levels of closeness to a given seat.

The progressive neighbor-based search procedure 520 starts with a step of searching 522 for the face embedding obtained in step 512, among only those facial embeddings stored in the database 130 that correspond to a first level neighbors of the seat location 104-8 determined in step 506. More specifically, as illustrated in FIG. 7, a seat region 108A of the venue 100 includes seats that are labeled by their row number R and seat number S (R, S). For example, the seat location (3, 5), which corresponds to row 3, seat 5, corresponds to the detected seat 104-8 (in FIG. 6B) in step 506. Because the facial embeddings of the registered attendee 108-8 for this seat do not correspond in the scenario of FIG. 6C to the facial embeddings (for attendee 200-2) detected in step 512, only the facial embeddings corresponding to the direct neighbors (called level 1 neighbors) of seat (3,5) are considered in step 524. This means, that for the matching search performed by the procedure 520, in the example of FIG. 7, only level 1 neighbors (2,5), (3,4), (3,6) and (4,5) are considered.

In one application, a direct neighbor is considered an adjacent neighbor along a row direction (left and right) or column direction (up and down). In other words, FIG. 7 shows that seat (3,5) has only four level 1 neighbors. In case that the search for the level 1 neighbors fails to find the selected attendee from step 504, then the level 2 neighbors are searched. The level 2 neighbors of seat (3,5) are considered all the direct neighbors of the level 1 neighbors (2,5), (3,4), (3,6), i.e., the level 2 neighbors are (1,5), (2,4), (2,6), (3,3), (3,7), (4,4), (4,6), and (5,5). Thus, the progressive neighbor-based procedure 520 will search next the level 2 neighbors, if the level 1 neighbors produced no match. The progressive neighbor-based procedure 520 then expands to the next level, until a match is found. The progressive neighbor-based procedure 520 minimizes the computational load by performing an increment search, which makes the method quicker than the existing methods. In addition, procedure 520 is scalable, i.e., each to adapt to large venues.

In one embodiment, the level 3 neighbors may be an entire row. One skilled in the art would understand that the various levels of neighbors may be defined in different ways, for example, using a radius. In other words, the level 1 neighbors may be those seats that are within a circle of radius 1 m of the selected seat (3, 5), the level 2 neighbors may be those seats that are in a circle of radius 2 m from which the level 1 neighbors were removed, and so on. In one application, instead of using a circle, another geometrical figure may be selected. The neighbors may be expanded to the next level if the search in the current level is unsuccessful. Thus, in the following, it is considered that a given level of neighbors includes N neighbors.

Next, the method proceeds to step 526, where a queue Q is initiated to include the neighbors at the given level (e.g., N=4 for the first level, N=8 for the second level, etc.). A list marked M includes all the seats that have been tested. Next, the method adds 528 the N=4 neighbors of the detected seat 104-8 in FIG. 6C, which corresponds to seat (3,5) in FIG. 7, to the queue Q. The method checks in step 530 that the queue Q is not empty. If the queue Q is empty, the procedure stops. If the queue Q is not empty, the method extracts 532 the first seat number from the queue Q and removes this seat number from the queue Q. The extracted seat number is checked in step 534 against the list M. If the extracted seat number is present in the list M, the method returns to step 532, as this step has already been checked. If the extracted seat number is not present in list M, the method advances to step 536, and the seat number is added to the list M, and the direct neighbors of the extracted seat number are added to the queue Q. The method may add in step 538 new neighbors to the queue Q, e.g., from a next level.

In step 540, the method checks the facial embeddings associated with the selected attendee 200-2 in step 504, against the stored facial embeddings. The "checking" may involve, for example, applying a similarity metric between a mathematical vector (facial embedding) corresponding to the detected attendee and the stored attendees. In one example, the similarity metric is a cosine similarity. If the similarity metric generates a value larger than a predefined threshold, between the detected attendee and one stored attendee, then the method considers that there is a match between the two attendees. If a match is negative, the method returns to step 530, for selecting the next seat from the queue Q.

If a result of the match 540 is positive, the method advances to step 518. Note that the procedure 520 sequentially increases the size of the queue Q with the neighbors of the initial seat (3, 5) if none of these neighbors match one attendee of the database 130. FIG. 8 illustrates the configuration of the information stored by the database 130. This information includes the seat number 802 of each attendee, the row 804 and column 806 of each seat, the facial embeddings 808 for the attendee registered for the seat 802, an assigned user ID 810 for that attendee, and the neighbor seats 812 of the attendee of seat 802.

The method uses in steps 514 and 540 one or more ANN algorithms (e.g., FAISS, HNSW) to compare the detected facial embedding with the subset of embeddings for each search level. The information sent in step 518 may include a current location of the selected attendee, a live video feed, a behavior history and/or flagged incidents for that attendee, their name, their phone number, etc.

A specific example of using the method 500 is now discussed. The surveillance module 404 identifies an abnormal behavior at a given seat, and flags that sea. The matching module 406 starts with the flagged seat, where the abnormal behavior was detected, e.g., seat (3,5) in FIG. 7. The method 500 initially checks 514 the facial embedding of the detected person against the facial embedding of the person registered, during the registration procedure 300, for the detected seat. If the checking generates a match, the agents are notified about the details of the detected person and the method stops. If the checking generates no match, the method 500 retrieves the level 1 neighbors of the flagged seat (3,5). The method queries the database 130 for the level 1 neighbors and receives the seats directly adjacent to the flagged seat (3,5), i.e., seats (3,4), (3,6), (2,5), and (4,5). The matching module 406 then performs the matching step 540 only for the level 1 neighbors at this stage.

If the matching module 406 does not find any match, then the procedure 520 expands the matching to the level 2 neighbors. For each level 1 neighbor, the method 500 retrieves its direct neighbors from the database 130. For example, for the level 1 neighbor (3,4), its direct neighbors (level 2 neighbors) are seats (3,3), (2,4), (4,4), and (3,5). For level 1 neighbor (3,6), its direct neighbors are seats (3,7), (2,6), (4,6), and (3,5). If the matching module 406 fails again to find a match with the level 2 neighbors, the method expands to level 3 neighbors. Thus, the procedure 520 retrieves, for each level 2 neighbor, its direct neighbors from the database 130. For example, for neighbor (3,3), its direct neighbors are (3,2), (2,3), (4,3), and (3,4). For level 2 neighbor (3,7), its direct neighbors are seats (3,8), (2,7), (4,7), and (3,6). Then, the procedure 520 combines all level neighbors into a subset and creates a unique subset of all retrieved seats across levels 1, 2, and 3 to avoid duplicate checks. The procedure further compares 540 the facial embeddings of the level 1, 2, and 3 neighbors against the facial embedding of the detected person. The process continues by adding the next level neighbors if this matching step fails.

Figure 9:
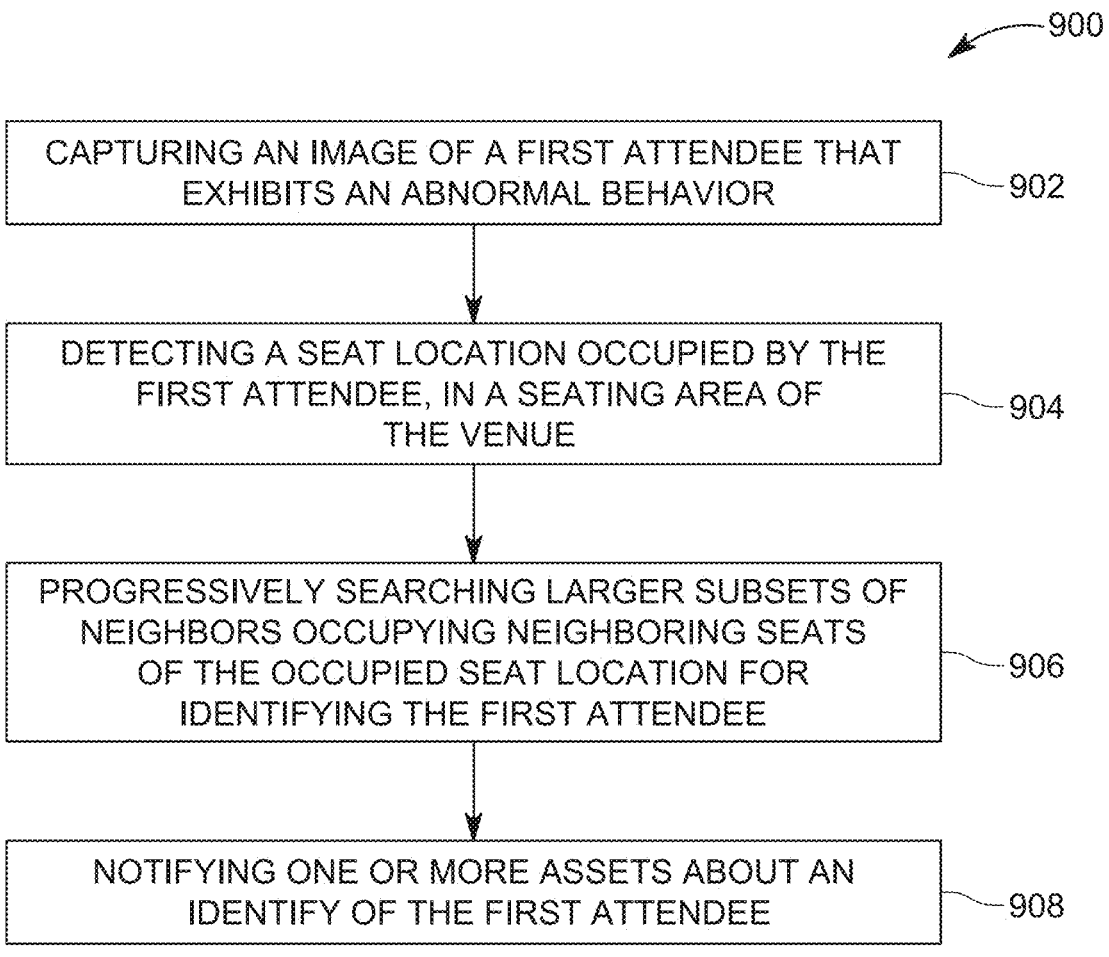
FIG. 9 is a flow chart of a method that uses the progressive neighbor search for identifying the attendee that exhibits the abnormal behavior.

A method 900 for real-time security monitoring within a venue 100, based on the procedure 520 illustrated in FIGS. 5A to 5C, is now discussed with regard to FIG. 9. The method includes a step 902 of capturing or receiving an image of a first attendee that exhibits an abnormal behavior, a step 904 of detecting a seat location occupied by the first attendee, in a seating area of the venue, a step 906 of progressively searching larger subsets of neighbors occupying neighboring seats of the occupied seat location for identifying the first attendee, and a step 908 of notifying one or more assets about an identify of the first attendee.

In one application, a facial embedding of the first attendee is different from a facial embedding of a second attendee assigned to occupied seat location. The step of progressively searching may include classifying all direct neighbor seats of the occupied seat as level 1 subset of neighbors, and classifying all direct neighbor seats of each seat in the level 1 subset of neighbors, minus the level 1 subset of neighbors, as level 2 subset of neighbors. A seat location in the venue has only four directly adjacent seat locations. The method may further include searching only the level 1 subset of neighbors for identifying the first attendee. The step of searching further includes determining facial embedding of the first attendee, and comparing the facial embedding of the first attendee with stored facial embeddings of the level 1 subset of neighbors.

The method may further include, when the searching fails to identify the first attendee, identifying the level 2 subset of neighbors of the first attendee, and searching only the level 2 subset of neighbors for identifying the first attendee. The method may further include registering the first attendee prior to entering the venue to generate and store the facial embedding, mapping the first attendee to an assigned seat location, and storing the assigned seat location and other information of the first attendee in the database. In one application, the other information includes a name and a phone number of the detected attendee. The first attendee is not registered to the occupied seat location.

Figure 10:
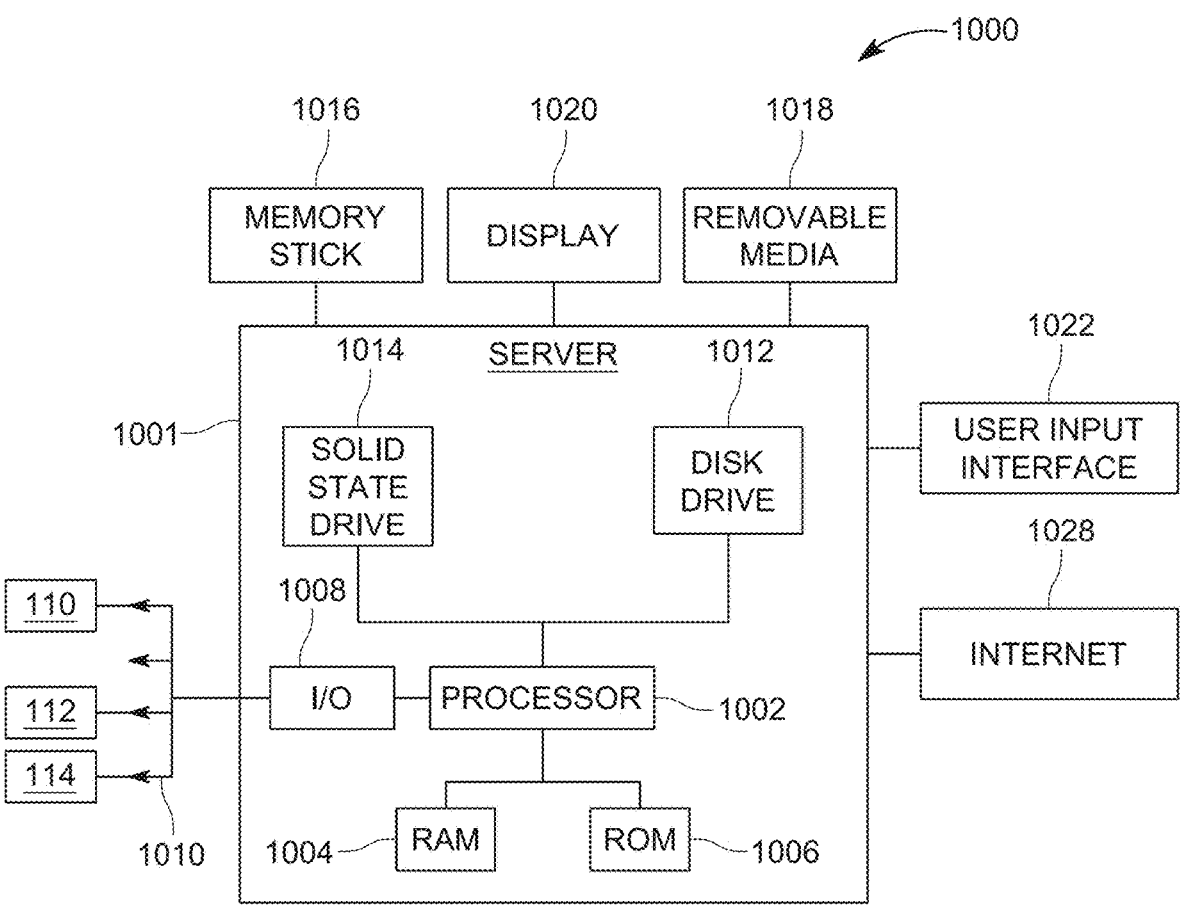
FIG. 10 is a schematic diagram of the security monitoring management system of FIG. 4.

The above-discussed procedures and methods may be implemented in a computing device (e.g., control module 120 in FIG. 1) as illustrated in FIG. 10. Hardware, firmware, software or a combination thereof may be used to perform the various steps and operations described herein. The computing device 1000 is suitable for performing the activities described in the above embodiments and may include a server 1001. Such a server 1001 may include a central processor (CPU) 1002 coupled to a random access memory (RAM) 1004 and to a read-only memory (ROM) 1006. ROM 1006 may also be other types of storage media to store programs, such as programmable ROM (PROM), erasable PROM (EPROM), etc. Processor 1002 may communicate with other internal and external components through input/output (I/O) circuitry 1008 and bussing 1010 to provide control signals and the like. The external components may be cameras 110 to 114. Processor 1002 carries out a variety of functions as are known in the art, as dictated by software and/or firmware instructions.

Server 1001 may also include one or more data storage devices, including hard drives 1012, solid-state drives 1014 and other hardware capable of reading and/or storing information, such as DVD, etc. In one embodiment, software for carrying out the above-discussed steps may be stored and distributed on a memory stick 1016, a solid state storage device 1018 or other form of media capable of portably storing information. These storage media may be inserted into, and read by, devices such as solid state drive 1014, disk drive 1012, etc. Server 1001 may be coupled to a display 1020, which may be any type of known display or presentation screen, such as LCD, plasma display, cathode ray tube (CRT), etc. A user input interface 1022 is provided, including one or more user interface mechanisms such as a mouse, keyboard, microphone, touchpad, touch screen, voice-recognition system, etc.

Server 1001 may be coupled to other devices, such as cameras 110 t0 114, sensors (e.g. $CO_2$ or temperature sensor) or any other data collection system. The server may be part of a larger network configuration as in a global area network (GAN) such as the Internet 1028, which allows ultimate connection to various landline and/or mobile computing devices.

As described above, the apparatus 1000 may be embodied by a computing device. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 1002 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 1002 may be configured to execute instructions stored in the memory device 1004 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The modules 406 to 410 shown in FIG. 4 may be implemented in the computing device 1000. In one application, one or more of these modules may employ machine learning and/or deep learning algorithms. As used herein, the term "deep learning" refers generally to a popular machine learning method. Two main architectures associated with deep learning are applicable to addressing at least some of the particular technical challenges associated with bioinformatics environments: the convolutional neural network ("CNN") and the recurrent neural network ("RNN"). In some instances, these deep learning architectures have proven effective in addressing technical challenges associated with face matching.

Instead of being a pure classifier that depends on the manually-designed features such as SVM, CNN is considered to be an end-to-end wrapper classifier, at least in the sense that some CNN-based architectures are able to perform feature extraction based on the classification result and improve the performance of the machine learning model in a virtuous circle. As a complement to the capability of CNN-based architectures to capture significant features from a two-dimensional or three-dimensional matrix, RNN has the potential of encoding long-term interactions within the facial embeddings, which is usually a one-dimensional vector, such as the encoding of English words. In some example implementations of embodiments of the invention discussed and otherwise disclosed herein, the advantages of CNN and RNN are combined by using CNN to conduct feature extraction and dimensionality compression starting from the relevant raw data, and by using RNN to extract the facial embeddings from one or more images (captured or stored).

In overcoming some of the technical challenges associated with predicting the proper classification of a captured face image, example embodiments of the invention discussed and otherwise disclosed herein address aspects of face function prediction as a classification problem with a tree structure in the label space, which can be viewed and treated as a hierarchical classification challenge. By viewing the prediction of the classification of a captured face as both a multi-label classification challenge and as a multi-class classification challenge, three approaches to implementing a solution are possible: a flat classification approach, a local classifier approach, and a global classifier approach. Example implementations of embodiments of the invention disclosed and otherwise described herein reflect an advanced local classifier approach, at least in the sense that example implementations involve the construction of one classifier for each relevant internal node as part of the overall classification strategy.

In this regard, FIG. 10 shows an example system environment 1000 in which implementations involving the efficient face matching function may be realized. The depiction of environment 1000 is not intended to limit or otherwise confine the embodiments described and contemplated herein to any particular configuration of elements or systems, nor is it intended to exclude any alternative configurations or systems for the set of configurations and systems that can be used in connection with embodiments of the present invention. Rather, FIG. 10 and the environment 1000 disclosed therein is merely presented to provide an example basis and context for the facilitation of some of the features, aspects, and uses of the methods, apparatuses, and computer program products disclosed and contemplated herein. It will be understood that while many of the aspects and components presented in FIG. 10 are shown as discrete, separate elements, other configurations may be used in connection with the methods, apparatuses, and computer programs described herein, including configurations that combine, omit, and/or add aspects and/or components.

It will be appreciated that all of the components shown in FIG. 10 may be configured to communicate over any wired or wireless communication network, including a wired or wireless local area network (LAN), personal area network (PAN), metropolitan area network (MAN), wide area network (WAN), or the like, as well as interface with any attendant hardware, software and/or firmware required to implement said networks (such as network routers and network switches, for example). For example, networks such as a cellular telephone, an 802.11, 802.16, 802.20 and/or WiMax network, as well as a public network, such as the Internet, a private network, such as an intranet, or combinations thereof, and any networking protocols now available or later developed including, but not limited to, TCP/IP based networking protocols may be used in connection with system environment 1000 and embodiments of the invention that may be implemented therein or participate therein.

The term "about" is used in this application to mean a variation of up to 20% of the parameter characterized by this term.

It will be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

The disclosed embodiments provide a system and method quickly and efficiently matching a captured face to a stored face by using progressive neighbor-based search. It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for real-time security monitoring within a venue, the method comprising:
   capturing an image of a first attendee that exhibits an abnormal behavior;
   detecting, from the captured image, a seat location occupied by the first attendee, in a seating area of the venue;
   progressively searching, as the seat location occupied by the first attendee is different from an assigned seat location of the first attendee, larger subsets of neighbors occupying neighboring seats of the occupied seat location until matching a neighboring seat of the neighboring seats to the assigned seat location of the first attendee to determine an identity of the first attendee; and
   notifying one or more assets about the identity of the first attendee.

2. The method of claim 1, wherein a facial embedding of the first attendee is different from a facial embedding of a second attendee assigned to the occupied seat location.

3. The method of claim 2, wherein the step of progressively searching comprises:
   classifying all direct neighbor seats of the occupied seat as level 1 subset of neighbors; and
   classifying all direct neighbor seats of each seat in the level 1 subset of neighbors, minus the level 1 subset of neighbors, as level 2 subset of neighbors.

4. The method of claim 3, wherein a seat location in the venue has only four directly adjacent seat locations.

5. The method of claim 3, further comprising:
   searching only the level 1 subset of neighbors for identifying the first attendee.

6. The method of claim 4, wherein the searching comprises:
   determining facial embedding of the first attendee; and
   comparing the facial embedding of the first attendee with stored facial embeddings of the level 1 subset of neighbors.

7. The method of claim 6, further comprising:
   when the searching fails to identify the first attendee, identifying the level 2 subset of neighbors of the first attendee; and
   searching only the level 2 subset of neighbors for identifying the first attendee.

8. The method of claim 1, further comprising:
   registering the first attendee prior to entering the venue to generate and store the facial embedding;

mapping the first attendee to the assigned seat location; and
   storing the assigned seat location and other information of the first attendee in the database.

9. The method of claim 8, wherein the other information includes a name and a phone number of the first attendee.

10. The method of claim 1, wherein the first attendee is not registered to the occupied seat location.

11. A system for real-time security monitoring within a venue, the system comprising:
   an input interface configured to receive an image of a first attendee that exhibits an abnormal behavior;
   a processor in communication with the input interface, the processor configured to,
   detect, from the image, a seat location occupied by the first attendee, in a seating area of the venue;
   progressively search, as the seat location occupied by the first attendee is different from an assigned seat location of the first attendee, larger subsets of neighbors occupying neighboring seats of the occupied seat location until matching a neighboring seat of the neighboring seats to the assigned seat location of the first attendee; and
   notify one or more assets about the identity of the first attendee.

12. The system of claim 11, wherein a facial embedding of the first attendee is different from a facial embedding of a second attendee assigned to the occupied seat location.

13. The system of claim 12, wherein the processor is further configured to:
   classify all direct neighbor seats of the occupied seat as level 1 subset of neighbors; and
   classify all direct neighbor seats of each seat in the level 1 subset of neighbors, minus the level 1 subset of neighbors, as level 2 subset of neighbors.

14. The system of claim 13, wherein a seat location in the venue has only four directly adjacent seat locations.

15. The system of claim 13, wherein the processor is further configured to:
   search only the level 1 subset of neighbors for identifying the first attendee.

16. The system of claim 14, wherein the processor is further configured to:
   determine facial embedding of the first attendee; and
   compare the facial embedding of the first attendee with stored facial embeddings of attendees of the level 1 subset of neighbors.

17. The system of claim 16, wherein the processor is further configured to:
   when the searching fails to identify the first attendee, identify the level 2 subset of neighbors of the first attendee; and
   search only the attendees of the level 2 subset of neighbors for identifying the first attendee.

18. The system of claim 11, further comprising:
   a kiosk configured to register the first attendee prior to entering the venue to generate and store the facial embedding,
   wherein the processor is further configured to,
   map the first attendee to the assigned seat location; and
   store the assigned seat location and other information of the first attendee in the database.

19. The system of claim 18, wherein the other information includes a name and a phone number of the first attendee.

20. A non-transitory computer readable medium including computer executable instructions, wherein the instructions, when executed by a processor, implement a method for real-time securing monitoring within a venue, the medium comprising instructions for:

capturing an image of a first attendee that exhibits an abnormal behavior;

detecting, from the captured image, a seat location occupied by the attendee, in a seating area of the venue;

progressively searching, as the seat location occupied by the first attendee is different from an assigned seat location of the first attendee, larger subsets of neighbors occupying neighboring seats of the occupied seat location until matching a neighboring seat of the neighboring seats to the assigned seat location of the first attendee; and notifying one or more assets about the identity of the first attendee.

\* \* \* \* \*